United States Patent
Stevens et al.

(10) Patent No.: US 6,800,116 B2
(45) Date of Patent: Oct. 5, 2004

(54) STATIC DEAERATION CONDITIONER FOR PROCESSING OF BITUMEN FROTH

(75) Inventors: Geoffrey Stewart Stevens, Calgary (CA); Donald Norman Madge, Calgary (CA); William Lester Strand, Edmonton (CA)

(73) Assignee: Suncor Energy Inc., Fort McMurray (CA)

( * ) Notice: Subject to any disclaimer, the term of this patent is extended or adjusted under 35 U.S.C. 154(b) by 0 days.

(21) Appl. No.: 10/196,942

(22) Filed: Jul. 18, 2002

(65) Prior Publication Data

US 2004/0011201 A1 Jan. 22, 2004

(30) Foreign Application Priority Data

May 23, 2002 (CA) .............................................. 2387257

(51) Int. Cl.[7] .............................................. B01D 19/00
(52) U.S. Cl. .............................. 95/262; 95/242; 95/253; 96/204; 96/220; 96/176; 96/182; 210/188; 210/521
(58) Field of Search .......................... 95/242, 262, 253; 96/176, 180, 182, 185, 204, 205, 220; 210/188, 521, 522; 208/390, 391, 400

(56) References Cited

U.S. PATENT DOCUMENTS

| | | | | |
|---|---|---|---|---|
| 4,116,809 A | * | 9/1978 | Kizior | 208/425 |
| 4,859,317 A | * | 8/1989 | Shelfantook et al. | 208/391 |
| 5,223,148 A | * | 6/1993 | Tipman et al. | 210/744 |
| 5,236,577 A | * | 8/1993 | Tipman et al. | 208/390 |
| 6,358,404 B1 | * | 3/2002 | Brown et al. | 208/390 |
| 6,391,190 B1 | * | 5/2002 | Spence et al. | 208/390 |

FOREIGN PATENT DOCUMENTS

| | | | | |
|---|---|---|---|---|
| CA | 630710 | 11/1961 | | |
| CA | 841581 | 5/1970 | | |
| CA | 857306 | 12/1970 | | |
| CA | 873854 | 6/1971 | | |
| CA | 882667 | 10/1971 | | |
| CA | 910271 | 9/1972 | | |
| CA | 952844 | 8/1974 | | |
| CA | 1072473 | 2/1980 | | |
| CA | 1072474 | 2/1980 | | |
| CA | 1081641 | 7/1980 | | |
| CA | 1097574 | 3/1981 | | |
| CA | 1126187 | 6/1982 | | |
| CA | 1137906 | 12/1982 | | |
| CA | 1144098 | 4/1983 | | |
| CA | 1201412 | 3/1986 | | |
| CA | 1254171 | 5/1989 | | |
| CA | 1267860 | 4/1990 | | |
| CA | 1293465 | 12/1991 | | |
| CA | 2249679 | 4/1999 | | |
| GB | 2116447 A | * | 9/1983 | ........... B01D/17/02 |

* cited by examiner

Primary Examiner—Duane Smith
Assistant Examiner—Douglas J. Theisen
(74) Attorney, Agent, or Firm—Blake, Cassels & Graydon, LLP; Terry L. Leier (57) ABSTRACT

Discloses apparatus and method to deaerate and condition bitumen froth obtained from a primary tar sands bitumen extraction process comprising a vessel containing a plurality of inclined plates, called a static deaeration conditioner. The inclined plates of the static deaeration conditioner are substantially equidistantly spaced from each other and are inclined at an angle to the horizontal. The plates form a corresponding plurality of channels there between for the froth to be deaerated to flow along. The declination angle is selected to obtain a gravity induced froth flow rate in the channel that exhibits a lamella effect near laminar flow characteristics, which promotes the creation of a water-enriched froth region near the lower plate of the channel. A braking pump can be provided on an outlet port of the vessel to control the rate of flow through the vessel of the froth to be deaerated and conditioned.

34 Claims, 3 Drawing Sheets

STATIC DEAERATION CONDITIONER FOR PROCESSING OF BITUMEN FROTH

FIELD OF THE INVENTION

This invention relates to bitumen recovery from tar sands and more particularly to a treatment process for the reduction of entrained air in and conditioning of a froth product produced in a primary tar sand bitumen extraction process.

BACKGROUND OF THE INVENTION

Tar sands are a geological formation, which are also known as oil sands or bituminous sands. The tar sands deposits provide aggregates of sand, mineral and water impregnated with bitumen. Significant deposits of tar sands are found in Northern Alberta in Canada and extend across an area of more than thirteen thousand square miles. The tar sands formation extends from the surface or a zero depth to depths of two thousand feet below overburden. These tar sand bitumen deposits are significant, measured in billions of barrels equivalent of oil (BOE) and represent a significant portion of the worldwide reserves of conventional oil reserves including the oil reserves of the Middle East.

The tar sands deposits are composed primarily of particulate silica. The bitumen content varies from about 5% to 21% with a typical content of about 12% by weight of the total material of the tar sands formation. Also included is a clay and silt component ranging from about 1% to 50% and more generally 10% to 30% by weight as well as a small amount of water in quantities ranging between 1% and 10% by weight. The bitumen is quite viscous and has an API gravity of about 6° to 80° and typically includes 4% to 5% sulfur and approximately 38% aromatics.

A process to extract the bitumen from the mineral material and water is required to produce a commercial petroleum product. In general terms this process involves mixing tar sand with water and steam or just hot water in a mixing vessel to separate the bitumen from the water and solids of the tar sand and produce an initial slurry. This initial slurry is diluted with additional water as it leaves the mixing vessel and is then introduced into a cylindrical primary settler vessel (PSV) having a conical bottom. The coarse portion of the solids settles out in this vessel and is removed as an underflow or tailings stream. Buoyant bitumen has sufficient air attachment to move upwards onto the surface of the fluid in the PSV. Consequently, most of the bitumen, some water and minor amounts of solids accumulate at the surface of the primary settler vessel to form a primary froth. This primary froth overflows the vessel wall and is received in a launder extending around its rim becoming the feed stock froth for downstream processing. A middlings stream comprising water, fine solids and a minor amount of buoyant and non-buoyant bitumen is withdrawn from the mid-section of the vessel and is directed to aeration flotation cell equipment.

In an aeration flotation cell, the middlings are agitated and aerated as described for example in Canadian patent 857,306 to Dobson. The bitumen component of the middlings becomes attached to air bubbles introduced into the aeration flotation cell and rises through the cell contents to form froth. This froth is termed secondary froth. The secondary froth is combined with the PSV feed stream, and nearly 100% of the bitumen in the secondary froth goes to primary froth on the next pass.

The sand and residual bitumen that settle to the bottom of the PSV are removed as a tailings stream. Typically, the tailings stream is further processed in a step called tertiary flotation, which produces another bitumen recovery stream that is combined with and becomes part of the PSV feed stream. Tertiary flotation is thus sometimes called bitumen recovery from tailings.

The primary froth discharging from the PSV is feed stock froth for downstream processing. Typically, the feed stock froth that is produced comprises 62% bitumen, 29% water and 9% solids by weight. The feed stock froth that is produced has a temperature generally in the range of 50 to 65 degrees Celsius. The bituminous feed stock froth that is produced has a very high viscosity even at temperatures as high as 65° C. At this temperature the feed stock froth can have a viscosity of 16,000 cP and can be very difficult to pump because of this viscosity. The feed stock froth also contains a large volumetric percentage of air entrained as small bubbles. This air provided buoyancy to separate the bitumen from the sand material in the separation steps of the process. The air content of feed stock froth makes it difficult to pump as well. The supply of the bitumen to downstream processing at the processing plant requires a reduction in the air content of the froth to acceptable levels in order to promote adequate pumping efficiency. Also, air must be removed from the feed stock froth to maintain an air content that is outside the range of explosive limits when naphtha is added just prior to the process of froth cleaning, which is referred to as secondary extraction.

In the past, deaeration or the removal of air from the froth product has been accomplished by contacting the froth with low-pressure steam. Examples of froth deaeration using steam in various apparatus and steps in the bitumen recovery process are described in Canadian patents 630,710; 841,581; 1,072,474; 1,081,641; 1,137,906 and 1,144,098. The steam acts to release air from the froth through a combination of heating and reduction of the interfacial tension at the air-oil interface. The main disadvantage of steam deaeration is that it requires a supply of steam with the attendant capital and operating costs. Steam is also thought to be the cause of certain problems with emulsion formation in the feed stock froth, in that the water introduced in the form of steam tends to bind itself into the froth. The bound water requires additional work to remove it during the subsequent froth treatment steps.

Inclined plate separators have been heretofore proposed for use in separating solids from liquids, for example, as described in Canadian patent 1,097,574. Moreover, inclined plate separators have been proposed for bitumen extraction from tar sands as described in Canadian patents 1,201,412; 1,126,187; 1,254,171; 1,267,860 and published Canadian patent application 2,249,679. Heretofore, inclined plate separators have not been used for deaeration of bitumen froth.

SUMMARY OF THE INVENTION

The present invention uses an inclined plate separator to perform deaeration of a bituminous feed stock froth and operates without the need to inject steam into the froth to effect deaeration. The use of an inclined plate separator to effect bitumen froth deaeration is termed static deaeration herein. Static deaeration relies on the process known as reverse sedimentation to occur. The process of reverse sedimentation relies on the buoyancy of air bubbles in the froth to settle upwards due to the force of gravity given the differences in density between air and the other constituents of the froth.

An inclined plate separator arranged and configured in accordance with the invention provides satisfactory removal of the air entrained in the bitumen froth over a range of flow rates and range of temperatures that results in cost saving in comparison to processes that use steam to effect froth deaeration. The deaerated bitumen froth product will require further processing to become a marketable petroleum product; therefore, further processing of the deaerated bitumen froth requires transport of the deaerated bitumen froth product to other process equipment. A deaerated bitumen froth product produced by the inclined plate separator static deaerator of the present invention is more readily pumpable than conventionally deaerated froth, which facilitates transport of the static deaerated bitumen extract to other facilities in a bitumen extraction plant.

Variations and fluctuations in the feed froth air content do not adversely impact the air content of the output stream from the inclined plate separator froth deaerator. Tests reveal a low correlation between the product air content and the feed air content, provided process flow rates remain within approximately 20% of the nominal flow rate conditions prescribed for operation of the system. In accordance with the invention, static deaeration is preferably performed at temperatures above about 50° C.

The apparatus of the invention provides a plurality of equidistantly spaced plates forming substantially parallel surfaces defining channels therebetween. The plates are arranged to provide a declination angle incline relative to horizontal. The angularly arranged plates provide a plurality of channels or pathways with at least one common dimension through which the froth to be deaerated flows. The angularly arranged plates are inclined at an angle to the horizontal that is between 15 degrees and 60 degrees and are preferably inclined at an angle of 30 to 35 degrees to the horizontal. As a result of the declination of the plates of the inclined plate separator, flow of the froth to be processed through the inclined plate separator is assisted by the force of gravity. Separation of the air from the froth, that is deaeration of the froth, occurs through settlement of the composition during passage through the inclined plate separator deaerator through the process known as reverse sedimentation. The air is settled out of and separated from the froth during passage of the froth through the inclined plate separator. The declination angle is chosen to provide sufficient hydraulic head to overcompensate for the estimated wall friction between the plates and to ensure that mineral does not accumulate in the channel bottoms. In one arrangement the declination angle is 30° where the plate separation is 90 mm. In another arrangement, a declination angle of 35° is used where the plate separation is 80 mm.

The deaerated froth output has a substantial dynamic viscosity generally in the order of 15,000 centipoise or more. Transport of the deaerated froth to other equipment for further processing is carried out by pipe transport. The viscosity characteristics of the froth output influence the pump equipment needed to pump the froth to downstage treatment. It is known that certain bituminous froth mixtures have been found to be amenable to favorable pipeline flow characteristics, known as core-annular flow, which significantly reduces pump power requirements from what would be expected for the measured viscosity of the bituminous froth fluid. Thus it is desirable to provide a froth deaeration treatment which does not adversely affect or indeed enhances the range of conditions or tendency of the deaerated bituminous froth to exhibit the reduced effective viscosity which is a principal beneficial characteristic of core-annular flow. The core-annular flow phenomenon is manifested as a drop in effective viscosity with resulting significantly reduced pressure drop during transport of the froth through a pipeline. It is believed that the core-annular flow effect results from the formation of free-water in the froth as it traverses the pipeline. In accordance with one theory of core-annular flow, it is believed that during transport through the pipe, free-water in the froth is propelled towards the walls of the pipe, which provides a core-annular-flow lubrication effect that facilitates transport of the froth through a pipe.

Core-annular flow may also be induced in a bituminous froth by adding water to the pipeline in which the froth is to be transported in a manner known as or referred to as water pushing. This process for inducing a core-annular flow phenomenon is described for example in Canadian patent 2,254,048 and published Canadian patent application 2,220,821 both to Neiman et al.

An expected benefit of static deaeration is thought to be enhancement of the range of conditions under which bituminous froth deaerated and conditioned in accordance with the invention will exhibit core-annular flow characteristics relative to the conditions obtained from steam deaeration. Moreover, it is believed that the core-annular flow characteristics exhibited by bituminous froth deaerated in accordance with the invention will be more favorable than the core annular flow characteristics exhibited by bituminous froth deaerated using conventional steam deaeration. One hypothesis is that static deaeration releases an additional quantity of water from the froth, due to shearing action within the froth as it passes through the static deaeration conditioner of the present invention. This additional water, together with the submicron-sized solids that are also released from the froth, results in an additional and substantial reduction in friction in the froth transfer process over the friction reduction achieved using steam deaeration. As a result, there is an anticipated enhanced lubricity exhibited by froth conditioned by static deaeration conditioning using the principles of this invention relative to the natural froth lubricity exhibited by froth deaerated by conventional steam deaeration. This is termed enhanced froth lubricity herein.

The preferred embodiments of the invention will now be described with reference to the attached drawings.

DETAILED DESCRIPTION OF THE
PREFERRED EMBODIMENTS OF THE
INVENTION

Figure 1:
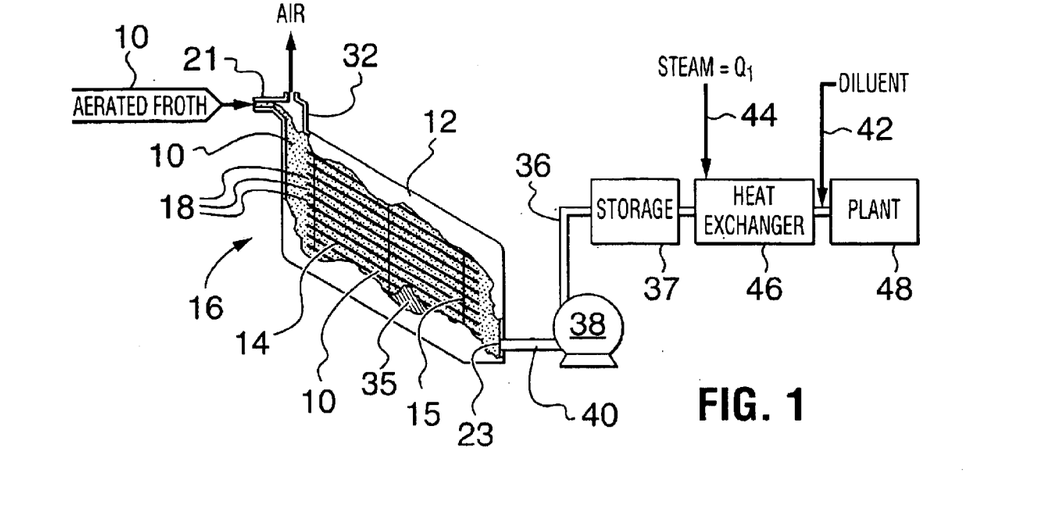
FIG. 1 is an elevation view of a preferred embodiment of an inclined plate separator configured in accordance with a portion of the enclosure shown removed for clarity in depicting the construction of the invention.

As shown in FIG. 1, a flow of aerated froth 10 consisting of bitumen, water, sand, clay fines and air is admitted to an inlet port 21 at an upper end of an enclosure 12. Enclosure 12 surrounds a plurality of angularly inclined equidistantly spaced plates 14 forming an inclined plate separator static deaeration conditioner 16. The exterior of the static deaeration conditioner 16 is preferably covered with insulation 35 to reduce the loss of heat energy contained in the aerated froth 10. Portions of the froth 10 flow into the channels 18 extending between the plates 14 and pass along each respective channel to collect at the exit region where the deaerated froth egresses the deaerator at an outlet port 23 coupled to conduit 40. Spacers 15 are provided to interconnect plates 14 in a spaced relationship to each other to provide a common separation dimension between the surfaces of each plate 14. The flow rate of the froth 10 through static deaeration conditioner 16 is preferably maintained at a rate, which obtains a lamella enhanced near laminar viscous flow of the froth between the plates 14 of the inclined plate separator static deaeration conditioner 16. The viscosity of the fluid froth produces a friction force that inhibits the flow of fluid froth through the separator. The friction forces are partly internal to the fluid and partly due to the contact of the fluid mixture with the plates of the inclined plate separator. The incline of the plates is selected to provide a gravitational force to overcome the viscous wall friction of the froth to pull the froth along the inclined plates of static deaeration conditioner 16 and to ensure no solids deposition at the bottom of the channels 18.

Figure 2:
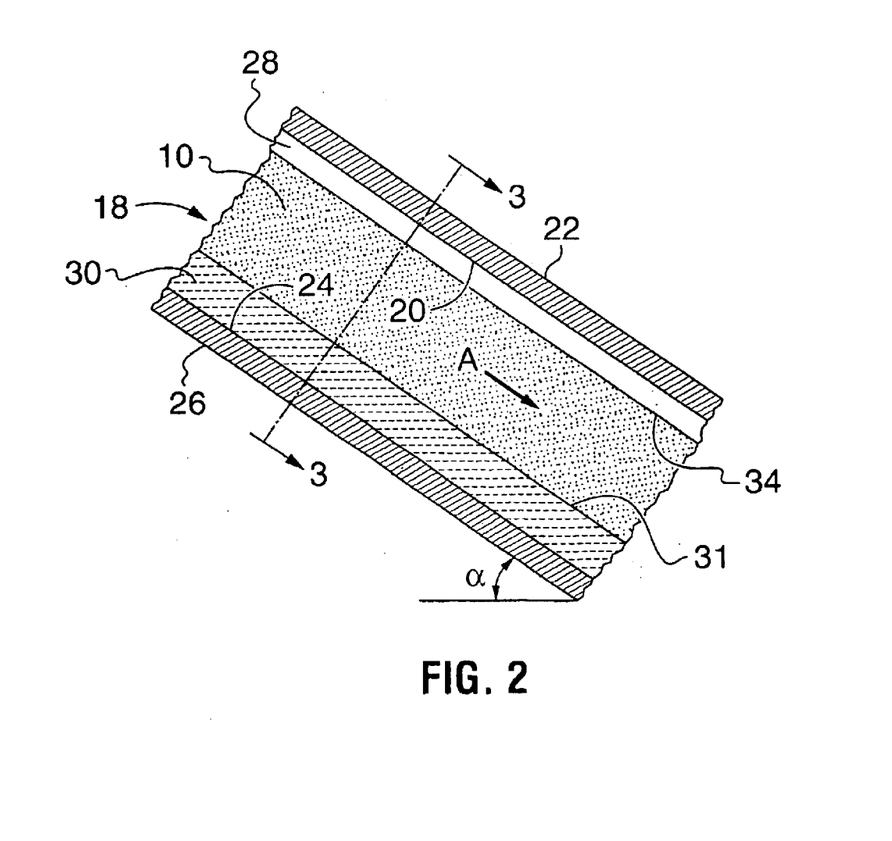
FIG. 2 is a cross section elevation view of a channel of the inclined plate separator of FIG. 1.

As shown more clearly in FIG. 2, a channel 18 is formed between the lower surface 20 of an upper plate 22 and the upper surface 24 of a lower plate 26. The froth passes through channel 18 in the direction of arrow A. The plates 22 and 26 are arranged in a substantially equidistant parallel configuration with each other and are angled at a declination angle "α" alpha relative to horizontal. The angle of declination is chosen to provide sufficient hydraulic head to overcompensate for the estimated wall friction between the plates and to ensure no solids deposit on the bottom of the channel. In one arrangement the declination angle is 30° where the plate separation is 90 mm. In another arrangement, a declination angle of 35° is used where the plate separation is 80 mm. During passage of the froth through the channels 18 of the inclined plate separator, air bubbles within the froth tend to ascend to form a layer of air 28 along the top of the froth 10. The air layer 28 acts to isolate the fluid froth from the lower surface 20 of the upper plate 22. Also, a water-enhanced layer 30 forms along the upper surface 24 of the lower plate 26. The upper layer of air 28 migrates upwardly to the upper portion of the vessel 12 of FIG. 1, and is continuously vented out vent 32 as represented by the "Air" arrow pointing upwardly from vent 32 of FIG. 1. The air expelled from froth 10 flows upwardly and countercurrent to the downward flow of froth 10 between the plates 22 and 26 due to buoyant forces. The airflow does not become impaired by the formation of foam. In a steady state, a minimum layer of air will exist due to the interfacial tension depicted as boundary 34 between the air 28 and the froth 10.

At the bottom of the plate gap or channel 18, the gravity induced fluid flow to the right and downward of the froth 10 causes a shearing action within the viscous (10,000 centipoise or more) body of the froth. The shearing action in the boundary region 31 causes water contained in the froth to move downward to form a water-enhanced layer 30 above the plate 26. The water-enhanced layer 30 and the froth form an emulsion boundary 31, which is stabilized and localized by the ultrafine clay particulate that is carried by the water. This particulate is mainly kaolinite, but also contains traces of illite as well, which are the main hydrophilic constituents of oil sand clay. A postulated prerequisite for the formation of this water-enhanced layer 30 is that the mixture of bitumen, mineral solids and water must be thixotropic (i.e. shear thinning) and not rheopectic or shear thickening. In order for the mixture to be thixotropic, it has been found that it is important for coarser mineral solids to be present in the bitumen froth 10 introduced into the inclined plate separator, and not just very fine mineral particles like those characterized by clay-like mineral.

When the bitumen froth to be treated 10 contains too much clay-like mineral, it may become rheopectic or shear thickening, which will produce results that will impair or defeat the desired action of the inclined plate separator. Rheopectic water retention makes the froth appear to be very stringy and the froth will not readily pass between the plates of the static deaeration conditioner nor will it be readily pumped after treatment in the static deaeration conditioner. With rheopectic froth, the water tends to be retained within the body of the bitumen froth. In this state, the water is not really free and bitumen fouling of the upper surface 24 of lower plate 26 may result. The froth composition acts as a barrier to the release of water at the lower plate 26, which consequently decreases the amount of free-water in the treated froth output from the static deaeration conditioner 16 separator resulting in a loss of lubricity.

On the other hand, with a thixotropic froth, the water in the froth is preserved in passage through the inclined plate separator static deaeration conditioner so that it can beneficially assist the froth transfer process. The important thing is that it is free-water and not dispersed through the bitumen. Being free the water readily forms an annulus during froth transfer in the pipeline. Being free it can absorb steam, consequently enabling sparge heating to be better effected by reducing incidence of shock and vibration. Finally, being free the water is more easily rejected or removed from the froth in the downstream froth treatment processes. If desired, the free-water can be removed by providing a purge or water tap at 40.

Reference is again made to FIG. 1. Since the bitumen froth produced by most warm water tar sands bitumen extraction processes is thixotropic, the static deaeration conditioner 16 produces a deaerated bitumen froth, which has an abundance of free-water that will readily support core-annular flow in the froth pipeline 36 downstream of the static deaeration conditioner 16. The deaerated froth treated in the static deaeration conditioner 16 is then stored in storage tank 37 to await downstream treatment, for example, heating by steam 44 in a heat exchanger 46. Heat exchanger 46 may be any suitable heat exchanger and preferably is a sparge heater, which permits heating of the deaerated froth by direct contact of the heating steam with the froth and, consequently, is less susceptible to fouling. Subsequently, the froth is typically treated with a diluent at 42 prior to delivery to an upgrade plant 48.

The inclined plate static deaeration conditioner uses gravity to force the bitumen froth through the gaps or channels 18 between the inclined plates 14. The bitumen froth 10 flows through channel 18 in the direction of arrow "A" at such a rate as to allow the air of the bitumen froth to ascend to and be expelled from the froth by natural buoyancy. It has been found that the deaeration process is efficient over a temperature range above about 45° C. As bitumen froth viscosity decreases with increasing temperature, above about 45° C. the viscosity of the froth becomes low enough to descend at the plate declination angle, which is between 15 degrees and 60 degrees, and preferably is about a 30° to 35° decline varying with plate separation. For example, a 30° declination is suitable for use with a static deaeration conditioner having a plate separation of 90 mm, while 35° is suitable for use with a static deaeration conditioner having a plate separation of 80 mm. Because the froth to be treated in a static deaeration conditioner is at a temperature above ambient, it is preferable to surround an exterior of the vessel forming the static deaeration conditioner with an insulating layer, a portion of which is shown at 35, to reduce heat transfer.

A flow control means 38 is disposed at the discharge line 40 of the inclined plate separator static deaeration conditioner 16. The flow control means 38 provides a control of the froth transit time within the static deaeration conditioner 16. Therefore, the flow control means 38 controls the froth flow rate through each channel 18 along its length to provide sufficient holdup time, or residence time of the froth within the deaerator, for the air entrained in the froth to be reduced to the desired proportion. The flow control means 38 is preferably constructed from an adjustable orifice control valve and operates to control the exit rate of the conditioned bitumen from the static deaeration conditioner 16. A braking pump may also be advantageously provided as a flow control means 38.

The desired air proportion is determined by the requirement to obtain froth having an air content that is suitable for efficient pumping and does not pose an explosion hazard when diluent is added during froth treatment. For bituminous froth, the desired air proportion is 8% or less air content by volume in the froth. The separator cell air content of the bitumen froth when it is separated and recovered from the tar sands can be as high as 50% volumetric by air. Thus, the reduction in air content of the bitumen froth after passage through the inclined plate separator static deaeration conditioner 16 is as much as 85%, which includes the spontaneous deaeration that occurs in the separator cell launder during transport to the static deaeration conditioner. As much as 50% of this 85% happens spontaneously. The remaining 35%, which consists of the smaller size portion of the bubble size distribution, is freed in the deaerator.

At the same time, sufficient water is made free by the process of shear thinning of the froth within the static deaerator that the annulus for lubrication of the treated froth in pipeline 36 is increased by a factor of 2 relative to natural froth lubricity that is manifest when froth deaeration is accomplished with the addition of steam. The process of shear thinning of the froth thereby reduces friction (enhances lubricity) of the froth by a factor greater than 2 relative to the natural lubricity of the froth when it entered the inclined plate separator.

Preferably, the plates 22, 26 are corrugated to prevent cross-flow and enhance the airflow in the air gaps by creating a channel for the air to flow through. The corrugated configuration is shown more clearly in FIG. 3.

Figure 3:
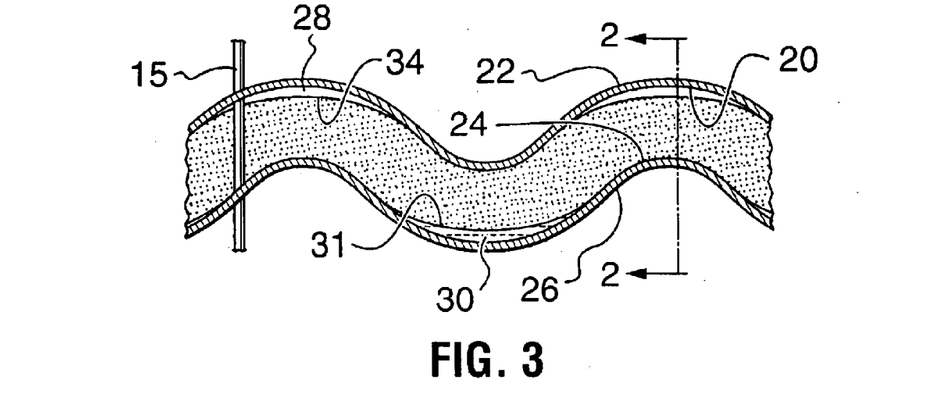
FIG. 3 is a cross section elevation view of a channel of the inclined plate separator along cutting line 3—3 of FIG. 2. For clarity, cutting line 2—2 of FIG. 3 is provided which provides a reference for the cross section view depicted in FIG. 2.

FIG. 3 shows a cross section view of a preferred plate configuration, which provides an undulating or corrugation surface in a cross section of the plates extending transverse to the path of the froth flow. This corrugation profile of the plates in the static deaeration conditioner acts as a conduit for the air that accumulates as the froth moves down the conditioning path between the plates to assist in venting the recovered air from the deaerator. Preferably these plate surfaces 20, 24 are made rough to facilitate and to promote the shear thinning processes within the froth. The roughening provides a breakage and coalescing of air bubbles in flight, which causes an increased or enhanced upward sedimentation due to the increased buoyancy of the coalesced air bubbles. A roughed surface does not promote surface fouling within the deaerator, which is testimony to the froth lubricity induced by the shear-thinning phenomenon within the static deaeration conditioner.

Figure 4A:
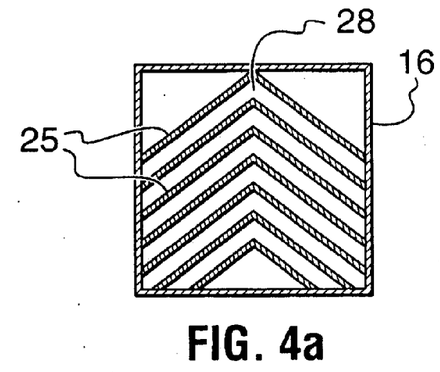
FIGS. 4a through 4c are area cross-sections showing some variations of plate profile and inclined plate separator geometry.
Figure 4B:
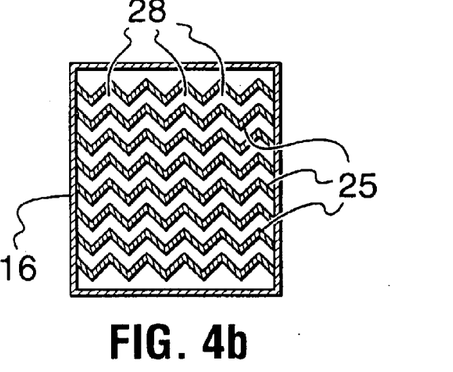
Figure 4C:
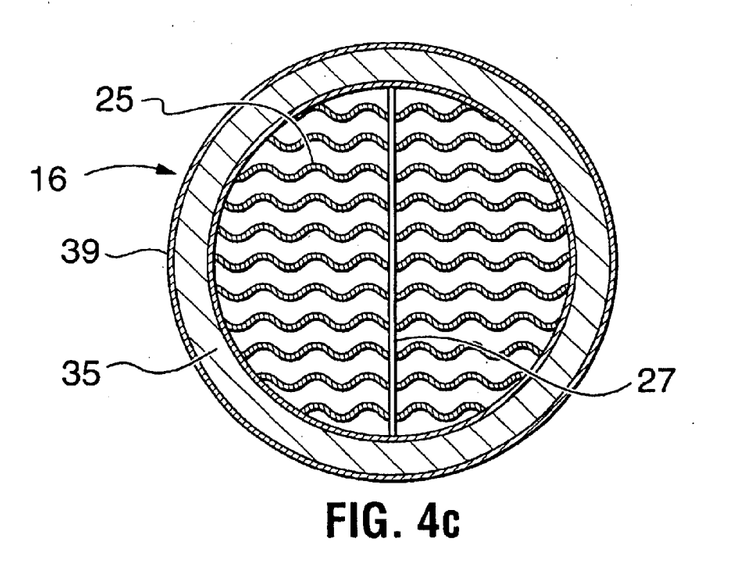

FIGS. 4a, 4b and 4c show variations in plate profiles and inclined plate separator geometry. In FIG. 4a, plates 25 have a chevron profile that will collect an upper layer of air 28 at the chevron apex located generally along a central vertical axis of the static deaeration conditioner 16. The plate profile of FIG. 4a is not preferred as it forms only a single air layer 28 forming a path at the apex of each channel for the air to exit along. This single air path is susceptible to fouling and plugging. FIG. 4b shows another variation of plate profile which has a repeating series of chevrons providing a plurality of upper air layer 28 collection points at each apex formed by the repeating chevrons. FIGS. 4a and 4b show a rectangular geometry of the inclined plates separator static deaeration conditioner 16 enclosure. FIGS. 4a and 4b have a rectangular cross-section profile of the enclosure that surrounds the plates 25. A rectangular cross-section profile is not preferred for large-scale constructions of considerable weight and size.

FIG. 4c shows a preferred geometry comprising a cross section profile of a circular geometry for the enclosure of the static deaeration conditioner 16. In the embodiment of FIG. 4c, the plates 25 have an undulating or corrugated profile which is a preferred plate profile as described with reference to FIG. 3. A central support 27 provides a structure for the individual plates 25 to be attached to to rest on. Surrounding the vessel is a layer of insulation 35 that is protected from the elements by a shielding layer 39.

Air bubbles in the froth within the plate region of the static deaeration conditioner 16 will rise due to buoyancy. The tendency of air bubbles to rise can be estimated from buoyancy rules known as Stokes Law or Swanson's Law. The air bubbles of the froth have a bubble size distribution approximated by the graph shown at FIG. 5.

Figure 5:
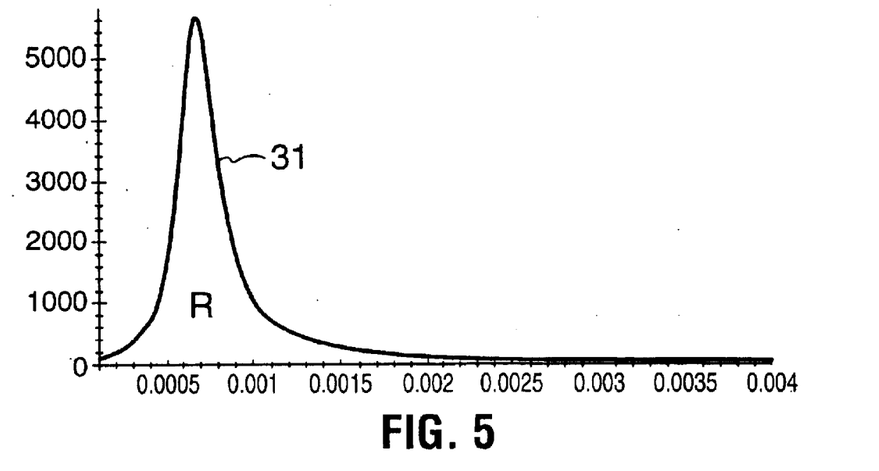
FIG. 5 is a graph of air bubble size distribution in a bitumen froth to be processed by a preferred embodiment of a static deaeration conditioner constructed in accordance with the principles of the invention.

FIG. 5 is a graph showing bitumen froth bubble size radii in meters along the abscissa and bubble counts along the ordinate. The graph is representative of Suncor PSV froth at 55 degrees Celsius. The graph provides a basis for determining relative bubble size populations useful in mathematical modeling of the static deaeration conditioner. The bubble count of the ordinate is obtained by counting froth bubbles within a microscopic field. The population counts are preferably scaled for use in process modeling to provide an area "R" under curve 31 that is equal to 1.0 to permit probability distribution functions to be employed.

The froth to be treated is admitted to the inlet port 21 of the static deaeration conditioner 16 where the froth is portioned among the plurality of channels 18 formed between the parallel inclined plates 14 of the deaerator. The froth flows along the channels 18 along the length of the deaerator. Passage of the froth down this channel length provides the air bubbles of the froth time to migrate to the lower surface of each upper plate and to accumulate and rise in a counter-current path to the downward flow of bituminous froth. To a first approximation, the rise velocity Vr of air bubbles in the flow through the inclined plate separator deaerator can be estimated using Stoke's Law, which is given by the formula:

$$Vr = \frac{r^2(\rho_f - \rho_a)g}{4.5\mu} \quad [1]$$

Where:
r is the radius of the bubble
$\rho_f$ is the density of the froth
$\rho_a$ is the density of the air
g is the acceleration of gravity
$\mu$ is the dynamic viscosity of the froth As indicated in equation [1], the rise velocity Vr of each bubble is related to the difference in densities of the froth and air and is also a function of the square of the air bubble radius r. Consequently, larger bubbles will rise faster than smaller bubbles. For a given plate geometry there exists a trajectory of air bubble paths that just intersect the exit zone at the tail end of the deaerator. For each size of bubble there exists such a trajectory called the critical trajectory. The critical trajectory is the path that bubble takes as it ascends between the plates within the downward movement of the bulk of the froth as it passes through the static deaeration conditioner 16 just in time to arrive at the air gap at the end of the plate pack. Larger bubbles can ascend a greater distance than smaller bubbles because of their higher rise velocity and consequently have a greater chance of intersecting the upward air channel 28 and thereby leaving the froth. Thus each bubble size has a different critical trajectory and some bubble sizes are virtually guaranteed to leave the froth stream before reaching the end of the deaerator. The critical trajectory is modified by the parabolic flow velocity profile of the fluid between the plates. This is equivalent to satisfying the boundary conditions of a laminar flow velocity profile.

It has been found that the rate of flow of the froth through the static deaeration conditioner 16 should be high enough to introduce a shearing action in the lower water enhanced region 30 of the froth proximal to lower plate 26. The shearing action at the lower plates disturbs the buoyancy predictions of equation [1] through the generation of lamella eddies in the water enhanced region 30. These eddies are rolling eddies, like the flow of water over a weir, that have the effect of sweeping air bubbles upward on the back-eddy portion of the path or undertow. The lamella eddies accomplish two benefits. The first benefit being the additional effect of air flotation and is effectively tantamount to increasing the strength of the gravitational field and the second being the shearing of water out of the froth on the upper surface of the lower plate. This shearing action results in an outward release of water because of the thixotropic, or shear-thinning nature of the froth. Accompanying this water is ultra-fine particulate that has a tendency to stabilize the emulsion layer permitting the formation of a lubricating layer of free-water on that surface. The stabilization of the ultra-fine particulate has been likened to the use of flour to reduce the stickiness of dough in the baking of bread. Thus the phenomenon might be called "dusting the dough." This free-water release is preserved in the subsequent steps of processing as the froth passes through the froth main storage tank 37 and thence on to post deaeration froth processing.

The impact of this water release on froth lubricity is dramatic even in comparison to that which was to be expected due to natural froth lubricity obtained when steam deaeration is used. For example, the number of pumps required with the enhanced froth lubricity obtained by passage of the froth through a static deaeration conditioner of the present invention is one quarter,of the number of pumps that would be expected with natural froth lubricity provided by steam deaeration. Enhanced froth lubricity is an unexpected benefit of froth treatment obtained by a process of froth deaeration using a static deaeration conditioner of the present invention.

The static deaeration conditioner is scaleable to a desired size. The channel height or plate gap is mainly controlled by the desire to avoid plugging from tramp material that can pass over the lip of the primary separation vessel. Froth residence time within the deaerator is selected to assure a target deaeration is obtained. For example, in a preferred embodiment adapted to process up to 185,000 barrels per day (bbl/d) synthetic crude oil (SCO) equivalent bitumen, three static deaeration conditioner units 16 are provided. In the arrangement of three inclined plate separator deaerators, each static deaeration conditioner 16 has 45 plates spaced at 80 mm forming or containing 44 channels. Each unit is approximately 18 meters in length. There are three units for this production rate and they are shared across two lines of production. The froth processed has its air content reduced to at least 8% by volume during its passage through the static deaeration conditioner.

Figure 6:
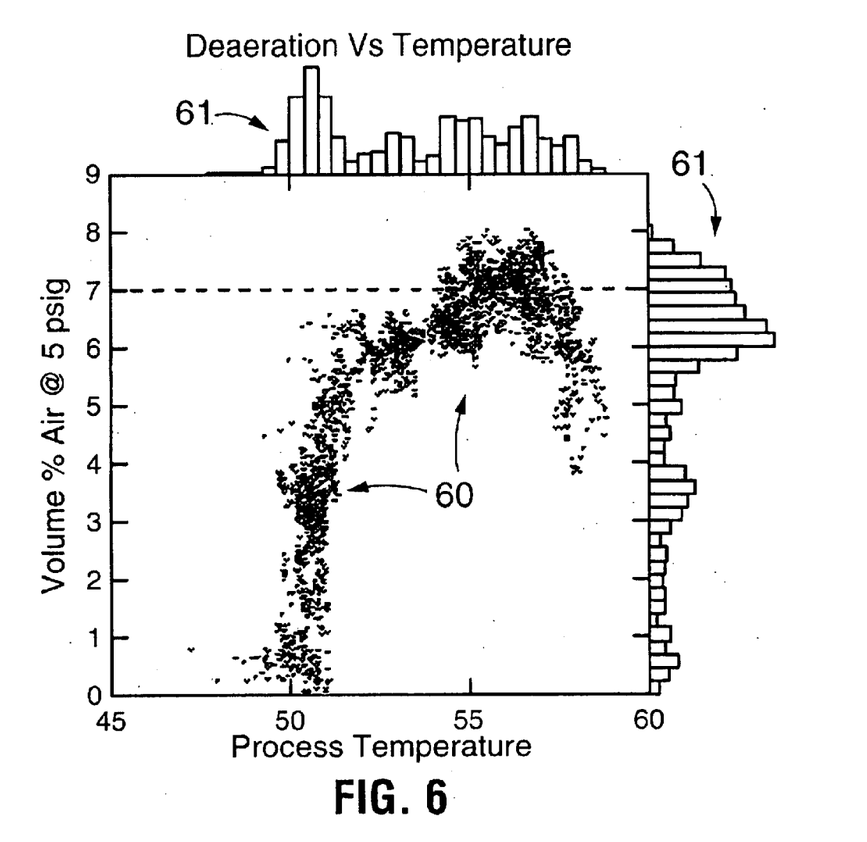
FIG. 6 is a two axis scatter plot of air content percent by volume versus temperature of bitumen froth that has been processed by a preferred embodiment of a static deaeration conditioner constructed in accordance with the invention.

Plate surface areas are modelled based on deaerator geometry. A simple geometry for modelling purposes is a rectangular parallelepiped. However, in order to provide structural strength for full-scale units other geometries are more desirable, for example a geometry having a circular cross-section. Thus modelling may require hydraulic mapping from Cartesian to cylindrical polar co-ordinates. With a circular cross-section geometry, plates near the mid-section, or diameter, of the geometry will have larger surface areas than other plates of the deaerator. Naturally corrugation will also be a factor in the modelling calculations, as corrugation will tend to increase the effective resistance provided by the plate pack cross-section. The invention is not restricted to the particular geometry of parallel plates of the embodiments described here specifically. ordinates. FIG. 6 shows a scatter plot of discharge froth air volume percent versus temperature based on samples of the deaerated froth at the exit from a preferred embodiment of an inclined plate separator static deaeration conditioner 16 constructed in accordance with the principles of the invention. The froth to be processed was supplied under constant flow conditions at temperatures that varied over a range from about 50 degrees Celsius to about 60 degrees Celsius. The discharge temperature is as indicated by the horizontal axis Process Temperature. The vertical axis corresponds to the measured percent volume air content of the froth measured on exit from the deaeration conditioner at a discharge pressure of 5 psig for the corresponding indicated temperature.

The measurement points 60 of the scatter plot were taken at discrete points in time as the process proceeded. The scatter plot reveals that the deaerated froth had an air content by percent volume that varied with temperature. At the lower temperature of the range, in the vicinity of 50 degrees, the froth becomes very viscous and sticky and passage through the static deaeration conditioner is hampered by the viscosity of the froth at this low temperature of the range. Consequently, the measured air content percent of the froth discharged from the static deaeration conditioner at this lower limit of the range exhibited a marked variation in percent content from 0% to approximately 5% providing poor correlation to temperature at this end of the range. Operation of an inclined plate separator static deaeration conditioner above about 52 degrees Celsius provides a more stable data for air content than can be achieved at temperatures below 52 degrees Celsius. The decreasing froth viscosity or corresponding increasing temperature will assist in deaeration of the bitumen froth as the bubble rise velocity, estimated by equation [1], will increase with increasing temperatures. With increasing froth temperature above 50 degrees, the air content percent of the froth exiting the static deaeration conditioner exhibits an increasing trend with a peak region of near 7% at a process temperature of approximately in the vicinity of 55 to 56 degrees Celsius. At temperatures above the temperature of this peak region, the exit air content percent of the deaerated froth exhibits a decreasing trend with increasing temperatures, which is a desirable result to obtain to effect deaeration of the froth. However, it will be understood that increasing operating temperatures of the froth to be processed in the static deaeration conditioner will require additional process heat to be added to the froth to obtain temperatures above ambient temperature, consequently increasing the cost of operating the process.

Data point histograms 61 along the upper and right sides of the graph show the relative counts of the data point measurements forming the scatter plot. It is preferable to operate a static deaeration conditioner of the present invention at temperatures above about 55 or 56 degrees Celsius to avoid the bitumen viscosity and stickiness characteristics that increasingly impede bubble rise velocity and froth flow through the inclined plates of the static deaeration conditioner at lower temperatures. Operation of the static deaeration conditioner at temperatures below the temperature exhibiting the apparent peak of froth exit air content (that is, the peak exhibited in the temperature range over about 55 to 56 degrees Celsius) is beneficially assisted by introduction of a lubricant into the froth, such as a silicone lubricant.

Further unexpected benefits in froth characteristics exhibited by froth deaerated by a static deaeration conditioner constructed and operated in accordance with the present invention are postulated. For example, the core-annular layer of water that is induced in the froth transfer pipeline 36 by froth that has been deaerated using static deaeration conditioning is anticipated to be much more pronounced than is the case for froth that has been deaerated using steam deaeration. This more pronounced core-annular layer of water should provide additional benefit in downstream phases, such as a froth-heating phase indicated by heat exchanger 46 of FIG. 1, by assisting in a smooth application of steam to the deaerated froth in a direct steam contact heater, or sparge steam heater. A sparge steam heater provides direct contact between nearly saturated steam and the deaerated froth. Sparge steam heating will cause flashing, vibration and shock when the supply steam is super heated or if the steam becomes superheated during interaction with the froth. Therefore, it is preferable to maintain a steam supply that is wet, that is to say steam that has no superheat. It is believed that the core-annular layers of a froth deaerated using an inclined plate deaerator in accordance with the invention will soak up this dryness or superheated steam, thereby significantly reducing incidence of flashing, vibration and shock. In the past the problem of flashing, vibration and shock has prevented the use of direct contact sparge steam heating units on bitumen froths that have been deaerated using steam deaerators heretofore employed. Preventing these unwanted sparge steam heating artifacts from occurring will remain challenging with static deaerated bitumen froths, but these difficulties are expected to be reduced partly due to the extra core-annular water present in froths deaerated using the static deaeration principles of the present invention.

The combined effect of water and solids release obtained using the static deaeration principles of the present invention are expected to provide benefit in froth treatment steps beyond heating and naphtha dilution. This result is projected from having increased the free-water content of the froth relative to the emulsified water content. The main froth-cleaning engine in upgrade plant 48 is an inclined plate separator, which operates better with respect to water removal if the free-water content is high. Thus the static deaeration conditioning process is believed to cause a potential 1% reduction in the water content of the IPS product relative to that obtained with steam deaeration.

With steam deaerated bituminous froths, long standstill periods are known to cause startup problems, for example in pipeline 36. One hypothesis is that this may be due to a lack of micro-particulate material in the annulus of water at the wall of the pipe. However, experience to date has shown that after long standstill periods controlled water injection is not required to restart bitumen froth flows of static deaerated bitumen froth in a pipeline. Thus, static deaeration conditioned froth does not require elaborate start up procedures for the froth transfer pipeline. Experience to date indicates that no more than one extra pump, temporarily deployed, is required to cause the core-annular water lubrication to occur.

Now that the invention has been described, numerous substitutions and equivalents will occur to those skilled in the art, however, the scope of the invention is defined in the claims appended hereto.

We claim:

1. Apparatus to condition a bitumen froth feed stream output from a tar sands primary separation process comprising:
    a vessel surrounding an interior volume, the vessel having a froth inlet port at an end of said vessel and a froth outlet port at another end of said vessel distal from the inlet port and an air vent proximal to said inlet port; and
    a plurality of parallel plates disposed within the interior volume of said vessel at an inclination angle alpha relative to the horizontal, said plates forming channels there between, each said channel extending from a region of said inlet port to a region of said outlet port.

2. The apparatus of claim 1 further including a flow control means connected to said outlet port, the flow control means operable to control the rate of flow of bitumen froth through said vessel.

3. The apparatus of claim 2 wherein said flow control means comprises an adjustable orifice control valve.

4. The apparatus of claim 2 wherein said flow control means comprises a braking pump.

5. The apparatus of claim 1 further including insulation surrounding an exterior of said vessel.

6. The apparatus of claim 2 further including insulation surrounding an exterior of said vessel.

7. The apparatus of claim 1 wherein said inclination angle alpha is between 15 degrees and 60 degrees.

8. The apparatus of claim 7 wherein said inclination angle alpha is between 30 degrees and 35 degrees.

9. The apparatus of claim 1 wherein said plates are equidistantly spaced 80 millimeters from one another.

10. The apparatus of claim 1 wherein said plates have an undulating profile.

11. The apparatus of claim 1 wherein said plates include a roughened surface.

12. A method for conditioning a bitumen froth feed stream output from a tar sands primary separation process comprising:
    supplying a bitumen froth feed stream output from a tar sands primary separation process to be conditioned at a temperature above about 50 degrees Celsius to an inlet port of a vessel, the vessel forming an interior volume enclosing a plurality of substantially equidistantly spaced plates disposed at an inclination angle alpha relative to the horizontal forming channels there between with at least one common dimension;

portioning said froth to each respective channel;

passing each said froth portion through a respective channel; and collecting said froth portions in a deaerated condition at an outlet port of said vessel.

13. The method of claim 12 further including the step of venting air expelled from said froth through an air vent of said vessel.

14. The method of claim 12 wherein the rate of flow of each said froth portion through a respective channel is fast enough to provide a lamella effect near laminar flow.

15. The method of claim 12 wherein the inclination angle alpha is more than 30 degrees.

16. The method of claim 12 wherein the air content by volume of the froth collected at an outlet port of said vessel does not exceed 8 percent.

17. The method of claim 12 wherein the temperature of the froth supply is above about 56 degrees Celsius.

18. Apparatus to deaerate bitumen froth recovered from tar sands comprising:

a vessel surrounding an interior volume, the vessel having a froth inlet port at an end of said vessel and a froth outlet port at another end of said vessel distal from the inlet port and an air vent proximal to said inlet port; and a plurality of substantially equidistantly spaced plates disposed within the interior volume of said vessel at an inclination angle alpha relative to the horizontal, each said plate substantially parallel to another to form a channel there between, each said channel extending from a region of said inlet port to a region of said outlet port.

19. The apparatus of claim 18 further including a flow control means connected to said outlet port, the flow control means operable to control the rate of flow of bitumen froth through said vessel.

20. The apparatus of claim 19 wherein said flow control means comprises an adjustable orifice control valve.

21. The apparatus of claim 19 wherein said flow control means comprises a braking pump.

22. The apparatus of claim 18 further including insulation surrounding an exterior of said vessel.

23. The apparatus of claim 19 further including insulation surrounding an exterior of said vessel.

24. The apparatus of claim 18 wherein said inclination angle alpha is between 15 degrees and 60 degrees.

25. The apparatus of claim 24 wherein said inclination angle alpha is between 30 degrees and 35 degrees.

26. The apparatus of claim 18 wherein said plates are equidistantly spaced 80 millimeters from one another.

27. The apparatus of claim 18 wherein said plates have an undulating profile.

28. The apparatus of claim 18 wherein said plates include a roughened surface.

29. A method for deaerating bitumen froth recovered from tar sands comprising:

supplying a bitumen froth to be deaerated at a temperature above about 50 degrees Celsius to an inlet port of a vessel, the vessel forming an interior volume enclosing a plurality of substantially equidistantly spaced plates disposed at an inclination angle alpha relative to the horizontal forming channels there between with at least one common dimension;

portioning said froth to each respective channel;

passing each said froth portion through a respective channel; and collecting said froth portions in a deaerated condition at an outlet port of said vessel.

30. The method of claim 29 further including the step of venting air expelled from said froth through an air vent of said vessel.

31. The method of claim 29 wherein the rate of flow of each said froth portion through a respective channel is fast enough to provide a lamella effect near laminar flow.

32. The method of claim 29 wherein the inclination angle alpha is more than 30 degrees.

33. The method of claim 29 wherein the air content by volume of the froth collected at an outlet port of said vessel does not exceed 8 percent.

34. The method of claim 29 wherein the temperature of the froth supply is above about 56 degrees Celsius.

* * * * *